(12) United States Patent
Yoshikawa et al.

(10) Patent No.: US 7,559,605 B2
(45) Date of Patent: Jul. 14, 2009

(54) VEHICLE SEAT, MOTOR VEHICLE, AND AIRBAG MODULE

(75) Inventors: Hiromichi Yoshikawa, Minato-Ku (JP); Teruhiko Hiruta, Minato-Ku (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/678,152

(22) Filed: Feb. 23, 2007

(65) Prior Publication Data
US 2007/0205587 A1 Sep. 6, 2007

(30) Foreign Application Priority Data
Mar. 2, 2006 (JP) .............................. 2006-056982

(51) Int. Cl.
*B60N 2/42* (2006.01)
*B60R 21/20* (2006.01)

(52) U.S. Cl. ................................. 297/216.1; 280/728.2

(58) Field of Classification Search .............. 297/216.1, 297/284.11; 280/743.1, 730.1, 728.2, 728.1
See application file for complete search history.

(56) References Cited

U.S. PATENT DOCUMENTS

| 4,746,168 | A  | * | 5/1988  | Bracesco ................. | 297/440.2 |
| 7,306,257 | B2 | * | 12/2007 | Yoshikawa et al. ....... | 280/728.2 |
| 2006/0017266 | A1 | * | 1/2006 | Yoshikawa et al. ....... | 280/730.1 |

FOREIGN PATENT DOCUMENTS

| EP | 1 510 420 A2 | 3/2005 |
| EP | 1 520 753 A1 | 4/2005 |
| EP | 1 623 887 A2 | 2/2006 |
| JP | 5-229378 | 9/1993 |
| JP | 2005-12605 | 5/2005 |

OTHER PUBLICATIONS

A search report dated Dec. 19, 2007, from the European Patent Office in corresponding European Application No. 07103312.0-2424.

\* cited by examiner

*Primary Examiner*—Milton Nelson, Jr.
(74) *Attorney, Agent, or Firm*—Fitch, Even, Tabin & Flannery (57) ABSTRACT

A technology is provided effective for securing strength while saving weight of a vehicle seat, on which an airbag module is mounted having a construction in which an airbag is developed and expanded from a downside to an upside of the seat cushion, against a movement of the vehicle occupant in a front of the motor vehicle, in a condition of the occupant being seated in the vehicle seat, at a time when an accident occurs. A vehicle seat with respect to one form of the present invention is constructed such that an airbag module, a seat pan and a bracket are fastened together and pressure caused at a time when an airbag is developed and expanded when an accident occurs is received by the seat pan and the bracket which are integrated by the together-fastening operation.

14 Claims, 11 Drawing Sheets

VEHICLE SEAT, MOTOR VEHICLE, AND AIRBAG MODULE

FIELD OF INVENTION

The present invention relates to a vehicle seat, and more in detail, to a construction technology for a vehicle seat, on which an airbag module having a construction in which an airbag is developed and expanded from a downside to an upside of a seat cushion against movement of a vehicle occupant toward a front side of the motor vehicle in a seating condition of the vehicle occupant in a vehicle seat when an accident occurs, is mounted.

BACKGROUND OF THE INVENTION

Hitherto, in a seat belt-wearing condition in which a seat belt is worn by a vehicle occupant seated in a vehicle seat, various technologies for blocking occurrence of a phenomenon, i.e., a so-called "submarine phenomenon", in which the vehicle occupant has a behavior to slip through a downside of a seat belt along a seat surface, along with a frontward movement of a waist portion of the vehicle occupant when an accident occurs, is proposed. For example, in Japanese Unexamined Patent Application Publication No. 5-229378, a vehicle seat having a construction in which an expanded airbag compresses a seat cushion from below so as to block the movement of the vehicle occupant toward a front side of the motor vehicle at the time of occurrence of the accident is disclosed. However, in designing such a kind of vehicle seat, there is a demand for a technology to construct a rational vehicle seat to be aimed at saving weight, and capable of securing strength corresponding to a load caused at a time that the airbag is activated.

Accordingly, it is a problem in the present invention to provide a technology effective for securing strength while saving weight of a vehicle seat on which an airbag module having a construction in which an airbag is developed and expanded from a downside to an upside of a seat cushion against movement of a vehicle occupant in a seating condition in a vehicle seat toward a front side of the motor vehicle when an accident occurs, is mounted.

SUMMARY OF THE INVENTION

To solve the aforementioned problems, the present invention is constructed. Incidentally, the present invention can be applied to a construction technology for a vehicle seat mounted on various kinds of motor vehicles, such as automobile motor vehicles, trucks, buses, electric trains, boats and ships, and so fourth.

The first form of the present invention for solving the aforementioned problems is a vehicle seat mounted on a motor vehicle, and constructed to be provided with at least a left side frame, a right side frame, a bracket, a seat pan, an airbag module, and a together-fastening member.

The left side frame according to the present invention is configured to be a seat frame component extending in a front and back direction at a left side below a seat cushion in a seat frame forming a skeleton of a seat. The right side frame according to the present invention is configured to be a seat frame component extending in the front and back direction at a right side below the seat cushion in the seat frame forming the skeleton of the seat. A bracket according to the present invention is configured to be a seat frame component for connecting the left side frame and the right side frame below the seat cushion in the seat frame forming the skeleton of the seat. The bracket and the left side frame, and the bracket and the right side frame are typically, connected by welding, fastening with a bolt and a nut, or the like.

A seat pan according to the present invention is configured to have a construction being disposed between the left side frame and the right side frame below the seat cushion, and including an airbag module housing portion. The "seat pan" according to the present invention is defined as a member constituting a seat bottom surface of the vehicle seat, and specifically, can also be defined as a seat cushion panel, a seat cushion frame, or a seat cushion board receiving the seat cushion. With regard to a disposing configuration of the seat pan, it is sufficient that entire, or a part of the seat pan is disposed between the left side frame and the right side frame. A construction in which the seat pan is fixed to the left side frame and the right side frame by welding, fastening with a bolt and nut, or the like, in a manner so as to be hung across the side frames, or a construction in which the seat pan is fixed to a member situated between the left side frame and the right side frame by welding, fastening with a bolt and nut, or the like, can be adopted.

The airbag module according to the present invention has a construction to be set such that the airbag module includes an airbag, and is housed in the airbag module housing portion, and the airbag is developed and expanded from a downside to an upside of the seat cushion against movement of a vehicle occupant in a condition of being seated in a vehicle seat, toward a front side of a motor vehicle when an accident occurs. The airbag module typically is mainly constructed with the airbag being folded back in a predetermined folding configuration and housed, a gas-supplying portion generating airbag-expansion gas and supplying the gas into the airbag when the accident occurs, a retainer for housing the gas-supplying portion. The airbag module can sometimes be also called as an "airbag apparatus" or an "occupant restraining apparatus".

The together-fastening member according to the present invention is constructed to be a member for performing a together-fastening operation for the airbag module, the seat pan, and the bracket. Typically, the together-fastening operation is enabled by use of a fastening operation by a bolt and a nut, a swaging operation by a rivet, and so forth. Further, in the present invention, pressure caused at the time when the airbag is developed and expanded when the accident occurs, namely a load caused at the time when the airbag module is activated, is received by the seat pan and the bracket that are integrally formed by the together-fastening operation, by means of that the airbag module, the seat pan, and the bracket are fastened together and fixed by the together-fastening member.

According to the construction described above, since the strength of the seat pan can be raised by means of that a board thickness of the bracket that is fastened together and fixed to the seat pan is added to the board thickness of the seat pan, it is enabled to secure the strength required for the vehicle seat, upon suppressing the board thickness of the seat pan by this extent.

Therefore, in accordance with the first form of the invention, strength can be secured while aiming at weight saving for the vehicle seat by means of a cooperative work of the seat pan and the bracket.

The second form of the present invention for solving the aforementioned problems includes the airbag module according to the first form which at least includes an airbag, a gas-supplying portion, a retainer, and a fixing bolt. The gas-supplying portion in the present invention is provided with a function for generating airbag-expansion gas and supplying the gas into the airbag when the accident occurs. The gas-supplying portion is housed in the retainer according to the present invention. The fixing bolt according to the present invention constitutes the together-fastening member attached to the retainer. The fixing bolt may be formed in an integrally fixed manner with the retainer, or may be attached to the retainer in a condition of a separate body. Further, in the present invention, the retainer, the seat pan, and the bracket are fastened together and fixed by means of fastening force of the fixing bolt in a condition in which the fixing bolt at the retainer side is inserted into a through-hole that penetrates through the seat pan and the bracket.

According to the construction described above, since the strength of the seat pan can further be raised by means of that a board thickness of the bracket that is fastened together and fixed to the seat pan is added to the board thickness of the seat pan, it is enabled to secure the strength required for the vehicle seat, upon further suppressing the board thickness of the seat pan by this extent.

Therefore, in accordance with the second form of the invention, strength can be secured while aiming at weight saving for the vehicle seat by means of a cooperative work of the retainer, the seat pan, and the bracket.

The third form of the present invention for solving the aforementioned problems is the vehicle seat constructed such that an extending direction of the fixing bolt is approximately conformed to a developing direction of the airbag at the time when the airbag is developed and expanded. That is, when the accident occurs, the airbag is configured to be developed along an axial direction of the fixing bolt. According to such a construction described above, fastening force of the fixing bolt can effectively be used as the force opposing to the airbag's load at the time when the airbag is developed and expanded.

The fourth form the present invention for solving the aforementioned problems is a motor vehicle that at least includes a vehicle seat according to any one of the first through third forms and a seat belt for restraining the vehicle occupant seated in the vehicle seat. Further, in a seat belt wearing condition in which the seat belt is worn by the vehicle occupant seated in the vehicle seat, the construction is formed such that occurrence of a movement of the vehicle occupant to slip through a downside of a seat belt along a seat surface, along with a frontward movement of a waist portion of the vehicle occupant when an accident occurs, i.e., a so-called "submarine phenomenon" is blocked by means of the airbag module mounted on the vehicle seat.

Therefore, in accordance with the fourth form of the invention, a motor vehicle capable of securing strength while being aimed at weight saving for the vehicle seat is provided.

The fifth form of the present invention for solving the aforementioned problems is an airbag module that has a construction substantially similar to the airbag module that serves as a component of the vehicle seat according to the first form.

Therefore, in accordance with the fifth form of the invention, an airbag module capable of being effectively used for securing the strength while being aimed at weight saving of the vehicle seat by means of a cooperative work of the seat pan and the bracket is provided.

The sixth form of the present invention for solving the aforementioned problems is an airbag module that has a construction substantially similar to the airbag module that serves as a component of the vehicle seat according to the second form.

Therefore, in accordance with the sixth form of the invention, an airbag module capable of being effectively used for securing the strength while being aimed at weight saving of the vehicle seat by means of a cooperative work of the retainer, the seat pan and the bracket is provided.

The seventh form of the present invention for solving the aforementioned problems is an airbag module constructed such that in the construction according to the sixth form, a developing direction of the airbag at a time when the airbag is developed and expanded is approximately conformed to an extending direction of a fixing bolt. That is, when the accident occurs, the airbag is developed along an axial direction of the fixing bolt. According to such a construction as described above, it is enabled for the fastening force of the fixing bolt to be efficiently used as the force opposing to an airbag load at a time when the airbag is developed and expanded.

As described above, according to the present invention, in a vehicle seat, on which an airbag module having a construction in which an airbag is developed and expanded from a downside to an upside of a seat cushion against a forward movement of a vehicle occupant in a seating condition in a vehicle seat toward a front side of a motor vehicle at a time of occurrence of an accident is mounted, it becomes enabled to secure the strength while aiming at weight saving for a vehicle seat, by constructing such that, specifically, the airbag module, a seat pan, and a bracket are fastened together and fixed, and pressure caused at a time when the airbag is developed and expanded when the accident occurs is received by the seat pan and the bracket that are integrally formed by being fastened together and fixed.

DETAILED DESCRIPTION OF THE PREFERRED EMBODIMENTS

Figure 1:
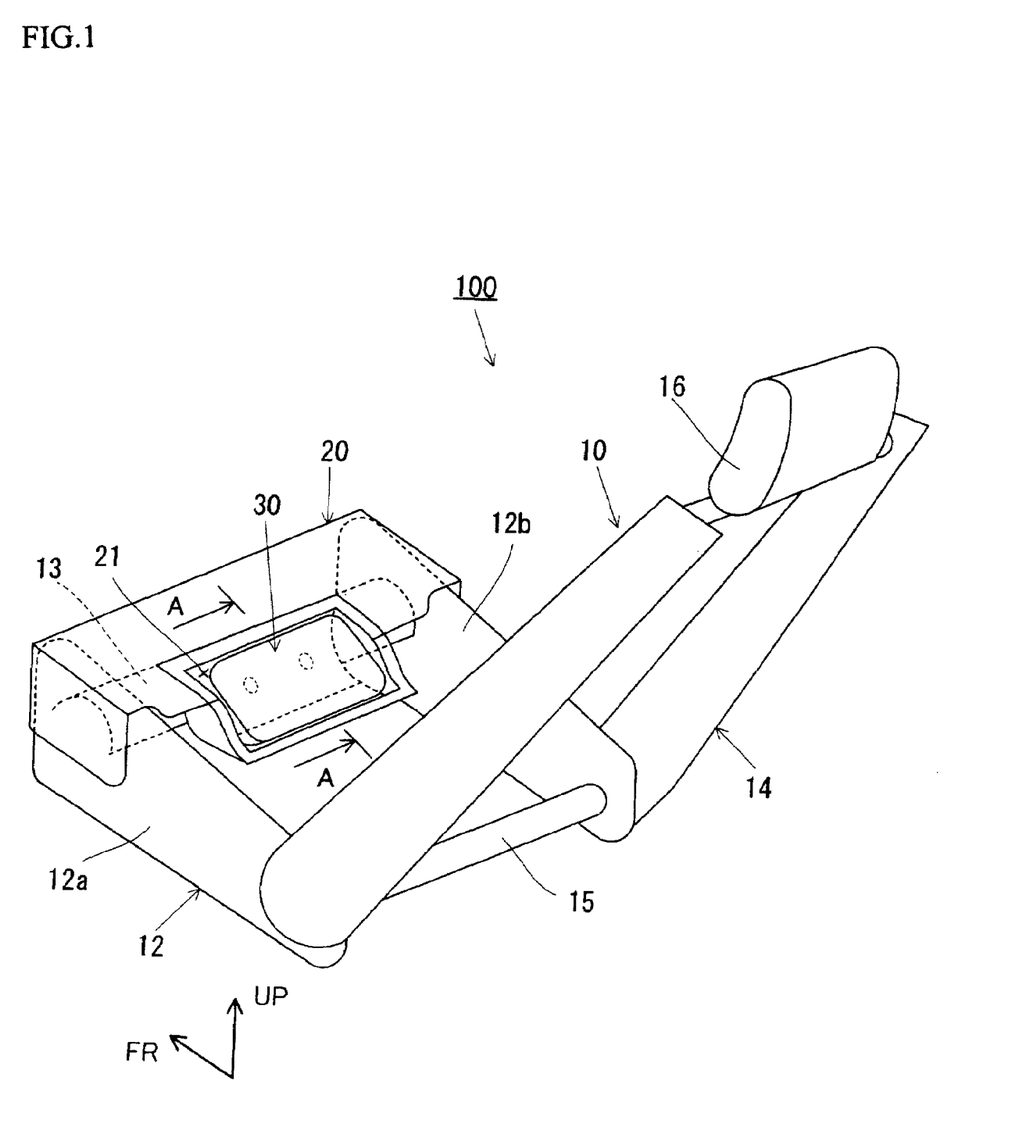
FIG. 1 is a view showing an internal structure of a vehicle seat 100 in the present embodiment and is a perspective view looking from diagonal backside of the motor vehicle.
Figure 2:
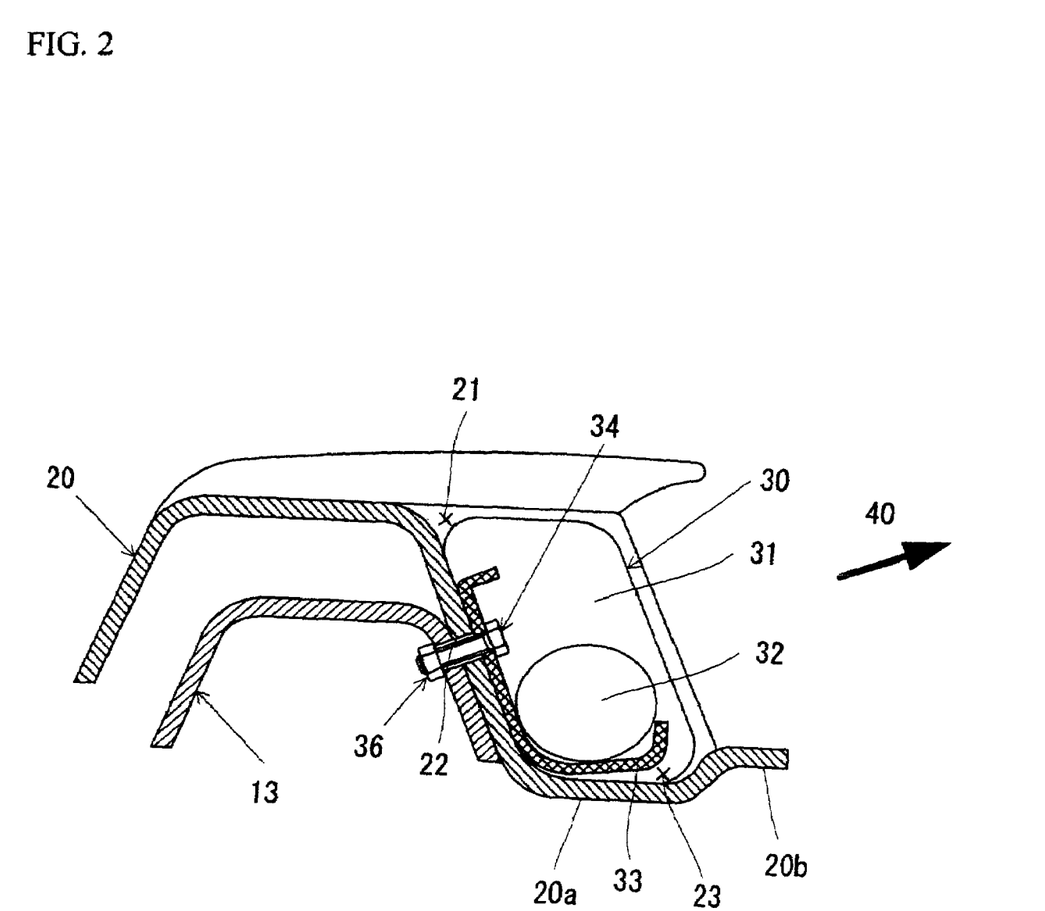
FIG. 2 is a cross-section along a line A-A in FIG. 1.

Hereinbelow, an embodiment of the present invention will be explained in detail referring to the drawings. Firstly, a construction of a vehicle seat 100 as an embodiment of a "vehicle seat" with respect to the present invention will be explained referring to FIG. 1 and FIG. 2. At this moment, FIG. 1 is a view showing an internal structure of the vehicle seat 100 according to the present embodiment, and is a perspective view looking from diagonal backside of the motor vehicle. Further, FIG. 2 is a cross-section at a line A-A in FIG. 1.

As shown in FIG. 1, the vehicle seat 100 according to the present embodiment is a vehicle seat to be mounted on a motor vehicle, and is mainly constructed of a seat frame 10, a seat pan 20, and an airbag module 30. The vehicle seat 100 is constructed to serve as a driver's seat where a driver is seated, or a passenger seat. Further, in the motor vehicle on which the vehicle seat 100 is mounted, a seatbelt (corresponds to a "seatbelt" in the present invention) to be worn by an occupant seated in the vehicle seat 100 is further mounted. Incidentally, a direction indicated by "FR" in FIG. 1 represents a front side of the motor vehicle, and that indicated by "UP" represents an upside of the motor vehicle.

The seat frame 10 is constructed to serve as a frame that forms a skeleton portion of the vehicle seat 100, and is at least provided with a base frame 12 and a back frame 14. The seat frame 10 corresponds to a "seat frame" in the present invention. On the base frame 12, a seat cushion (not shown) formed from a material having plasticity, such as a urethane material, or the like, is mounted, and the seat cushion constitutes a seat surface of the vehicle seat 100. Further, on the back frame 14, a seat back (not shown) formed from a material having plasticity, such as a urethane material, or the like, is mounted, and the seat back constitutes a back surface of the vehicle seat 100. Furthermore, an outer surface of each of the seat cushion and the back seat is covered with scurf skin (not shown) formed from leather, cloth, or the like.

The base frame 12 is a frame to be disposed below the seat cushion, and is provided with a left-and-right pair of side frames, 12a and 12b (a left side frame 12a, and a right side frame 12b), extending in a front and back direction of the vehicle seat 100 (conforming to a front and back direction of the motor vehicle). The left side frame 12a mentioned here corresponds to a "left side frame" in the present invention, and the right side frame 12b corresponds to a "right side frame" in the present invention.

Further, at an upper portion side of the base frame 12, a bracket 13 for reinforcement is provided so as to hang across the left and right side frames, 12a and 12b. The bracket 13 is constructed to be a plate shape (a curved plate shape in FIG. 1) having a predetermined board thickness, and is connected to the left and right side frames, 12a and 12b, by means of a welding process, a fastening process with a bolt and a nut, or the like. This bracket 13 serves as a supporting member for supporting the seat pan 20, and is constructed to serve as a holding member for connecting and holding the left and right side frames, 12a and 12b. In addition, the bracket 13 also serves as a positioning member when joining the left and right side frames, 12a and 12b, resulting in providing a good assembling capability. This bracket 13 corresponds to a "bracket" in the present invention.

The back frame 14 is a frame that is rotatably connected to the base frame 12 via a supporting shaft 15 and a reclining device (not shown). At an upper part of the back frame 14, a head rest 16 is attached to a position corresponding to a head portion of a vehicle occupant.

The seat pan 20 is provided so as to hang across the left-and-right pair of the side frames, 12a and 12b in a manner so as to cover the same from above, at a portion above the bracket 13 and below the seat cushion. The seat pan 20 is a member constituting a seat bottom surface of the vehicle seat 100, and specifically, can also be defined as a seat cushion panel that receives the seat cushion, a seat cushion frame, or a seat cushion board. Although described later in detail, the seat pan 20 is attached to the bracket 13 by means of the fastening process with the bolt and nut at two places. The seat pan 20 can also be joined to the left and right side frames, 12a and 12b, by means of the welding process or the fastening process with the bolt and nut. The seat pan 20 has a function to receive a load from the seat cushion. The seat pan 20 corresponds to a "seat pan" in the present invention.

Further, in the seat pan 20, a housing portion 21 for housing the airbag module 30 is provided. The housing portion 21 corresponds to an "airbag module housing portion" in the present invention. In the present embodiment, the housing portion 21 is constructed to have a hollow portion 23 (sometimes called as "concave portion", "cavity portion", or "concave area") that is downwardly hollowed. The hollow portion 23 is configured to be a portion where the airbag module 30 can be held by the hollow portion 23.

As shown in FIG. 2, the housing portion 21 is provided with a first extension portion 20a constituting a bottom surface of the hollow portion 23, and a second extension portion 20b extending to a rear side (right side in FIG. 2) in relation to the first extension portion 20a. A step portion (step shape) is formed by means of a difference of elevation in an upper and lower direction between the first extension portion 20a and the second extension portion 20b. In concrete terms, the construction is made such that the first extension portion 20a is extending at a portion lower than the second extension portion 20b. Further, the housing portion 21 is opened diagonally upward toward the backside. Accordingly, a developing direction (sometimes called "protruding direction") of an airbag (airbag 31 described later) of the airbag module 30 is configured to be a diagonally upward and backward direction, as a direction indicated by an arrow 40 in FIG. 2. Although described later in detail, according to a present construction, a work for housing the airbag module 30 in the housing portion 21, and a work for attaching and fixing the airbag module 30 to a seat pan 20 side is aimed at facilitating by means of a holding function (or a positioning function) of the airbag module 30 provided by the hollow portion 23 that is caved downward.

Further, according to the present construction, when the airbag module 30 is held at a proper position in the hollow portion 23, the airbag module 30 in the held condition is configured to be positioned at a front side in relation to the step portion between the first extension portion 20a and the second extension portion 20b. Accordingly, a protrusion of the airbag module 30 toward a second extension portion 20b side can be discriminated on the basis of a result of a visible confirmation between a first condition in which the airbag module 30 held by the hollow portion 23 covers the step portion and a second condition in which the covering operation is released. That is, a case, in which an entire step portion or a part of the step portion cannot be visibly confirmed, represents the first condition in which the airbag module 30 covers the step portion, and this results in that a rear end surface of the airbag module 30 is discriminated to be protruded out to the second extension portion 20b side across the step portion. At this moment, the airbag module 30 can be judged not to be located at a proper position. On the other hand, a case, in which the entire step portion can be visibly confirmed, represents the second condition in which the airbag module 30 does not cover the step portion, and this results in that the rear end surface of the airbag module 30 is discriminated not to be protruded out to the second extension portion 20b side across the step portion. At this moment, the airbag module 30 can be judged to be located at the proper position. By discriminating the protrusion of the airbag module 30 toward the second extension portion 20b side, it becomes to be enabled to prevent the airbag module 30 from being pinched by an airbag cover that covers the housing portion 21. With regard to visibility of the step portion, the visibility of the step portion can be aimed at being further improved by forming a colored line at the step portion.

Incidentally, the housing portion 21 of the seat pan 20 in the present embodiment has a construction including a hollow portion 23 that is caved downward. Therefore, the airbag module 30 in the housed condition (non-operating time) is aimed at being protected. Further, an airbag cover (not shown) that covers the housing portion 21 in a condition, in which the airbag module 30 is housed therein, is mounted on the seat pan 20, and protection for the airbag module 30 in the condition being housed by the airbag cover is aimed at being further improved.

As shown in FIG. 2, the airbag module 30 at least includes an airbag 31, a gas generator (sometimes called as, inflator) 32, and a retainer 33. The airbag module 30 corresponds to an "airbag module" in the present invention.

The airbag 31 is constructed as an airbag element that is folded back in a predetermined folding configuration and housed, and that is developed and expanded by gas generated by the gas generator 32 and supplied to the airbag element when an accident occurs. In concrete terms, the airbag 31 is developed and expanded from a downside to an upside of a seat cushion against movement of a vehicle occupant toward a front side of the motor vehicle in a seating condition of the vehicle occupant in a vehicle seat when the accident occurs. Thereby, in a seatbelt-wearing condition in which a seatbelt is worn by a vehicle occupant seated in a vehicle seat 100, a phenomenon, i.e., a so-called submarine phenomenon, in which the vehicle occupant has a behavior to slip through a downside of a seatbelt along a seat surface, along with a frontward movement of a waist portion of the vehicle occupant when the accident occurs, is blocked or suppressed. The airbag 31 mentioned here corresponds to an "airbag" in the present invention, and a "gas-supplying portion" in the present invention is constructed by the gas generator 32.

The retainer 33 is constructed to serve as a member for housing the gas generator 32. The retainer 33 corresponds to a "retainer" in the present invention. A fixing bolt 34 for attaching and fixing the airbag module 30 to the base frame 12 side is provided in the retainer 33. The airbag module 30 is attached and fixed to the base frame 12 side by means of the fixing bolt 34. In concrete terms, the fixing bolt 34 is configured to be able to be inserted into a through-hole 22 penetrating through the seat pan 20 and the bracket 13 in a condition in which the airbag module 30 is housed in the housing portion 21 of the seat pan 20. Accordingly, three members of the retainer 33, the seat pan 20, and the bracket 13 are integrally formed by being fixed to each other by being fastened together (sometimes called as "fixing by together-fastening") by fastening (screwing) the fixing bolt 34 penetrated through the through-hole 22, and the nut 36 with each other. In this case, the nut 36 may be constructed as a separate body from the bracket 13, or may have a construction in which the nut 36 is integrally jointed with the bracket 13. Further, a shape of a round hole, a long hole, a slit, or the like can appropriately be selected as the through-hole 22. The fixing bolt 34 mentioned here corresponds to a "together-fastening member" and a "fixing bolt" in the present invention.

Incidentally, the present embodiment is constructed such that an extending direction of a bolt axis of the fixing bolt 34 is approximately conformed to a developing direction of the airbag 31 along a direction indicated by an arrow 40 in FIG. 2. According to such a construction, it is enabled that fastening force of the fixing bolt 34 is effectively used as force against an airbag load when the airbag is developed and expanded.

A work for housing the airbag module 30 in the present embodiment in the housing portion 21 of the seat pan 20, and a work for attaching and fixing the airbag module 30 to the seat pan 20 side will be explained referring to FIGS. 3 through 6.

Figure 3:
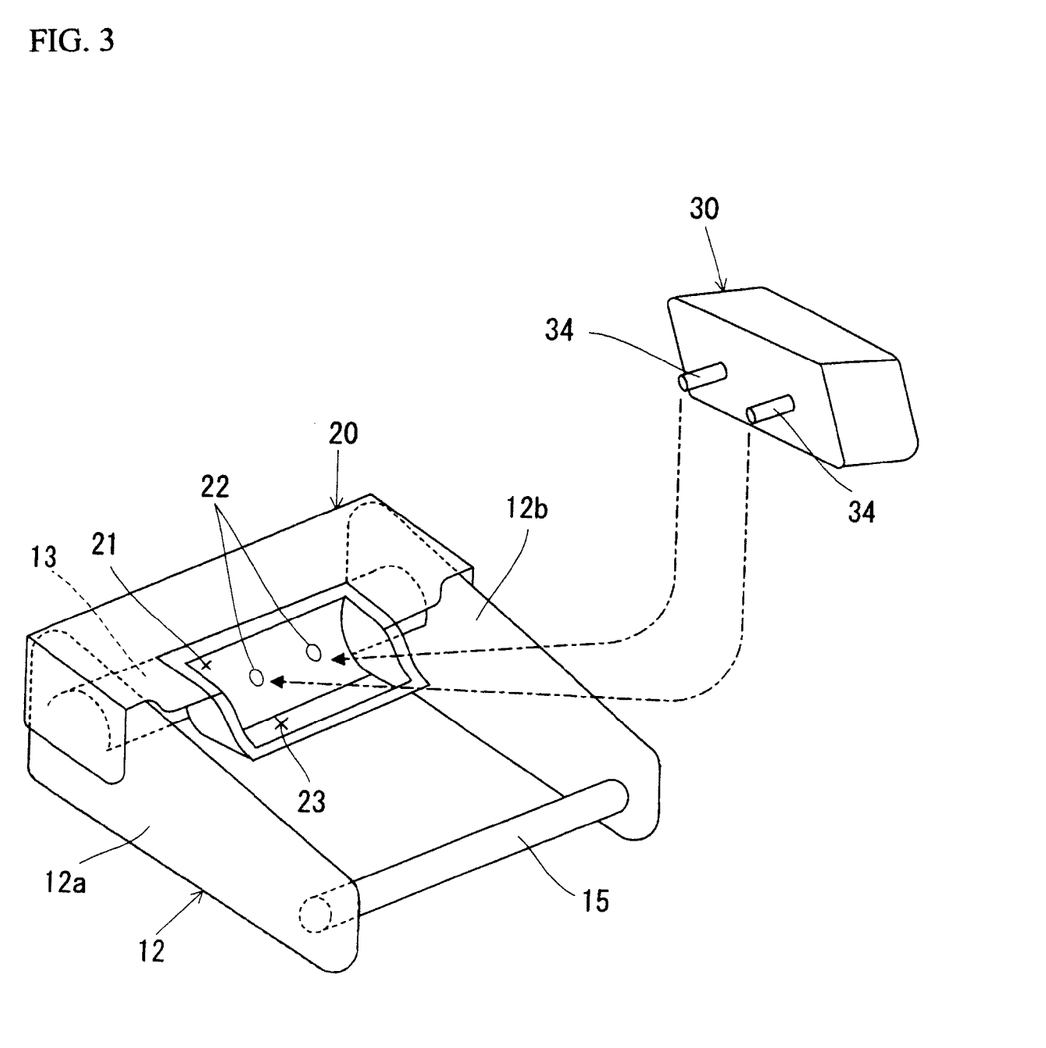
FIG. 3 is a perspective view schematically showing a work for housing an airbag module 30 into a housing portion 21 of a seat pan 20.

FIG. 3 is a perspective view schematically showing the work for housing the airbag module 30 into the housing portion 21 of the seat pan 20. As shown in FIG. 3, in the housing work for the airbag module 30, firstly, the airbag module 30 is moved to the housing portion 21 in a manner so as for the fixing bolt 34 at an airbag module 30 side to be headed to the housing portion 21 of the seat pan 20.

Figure 4:
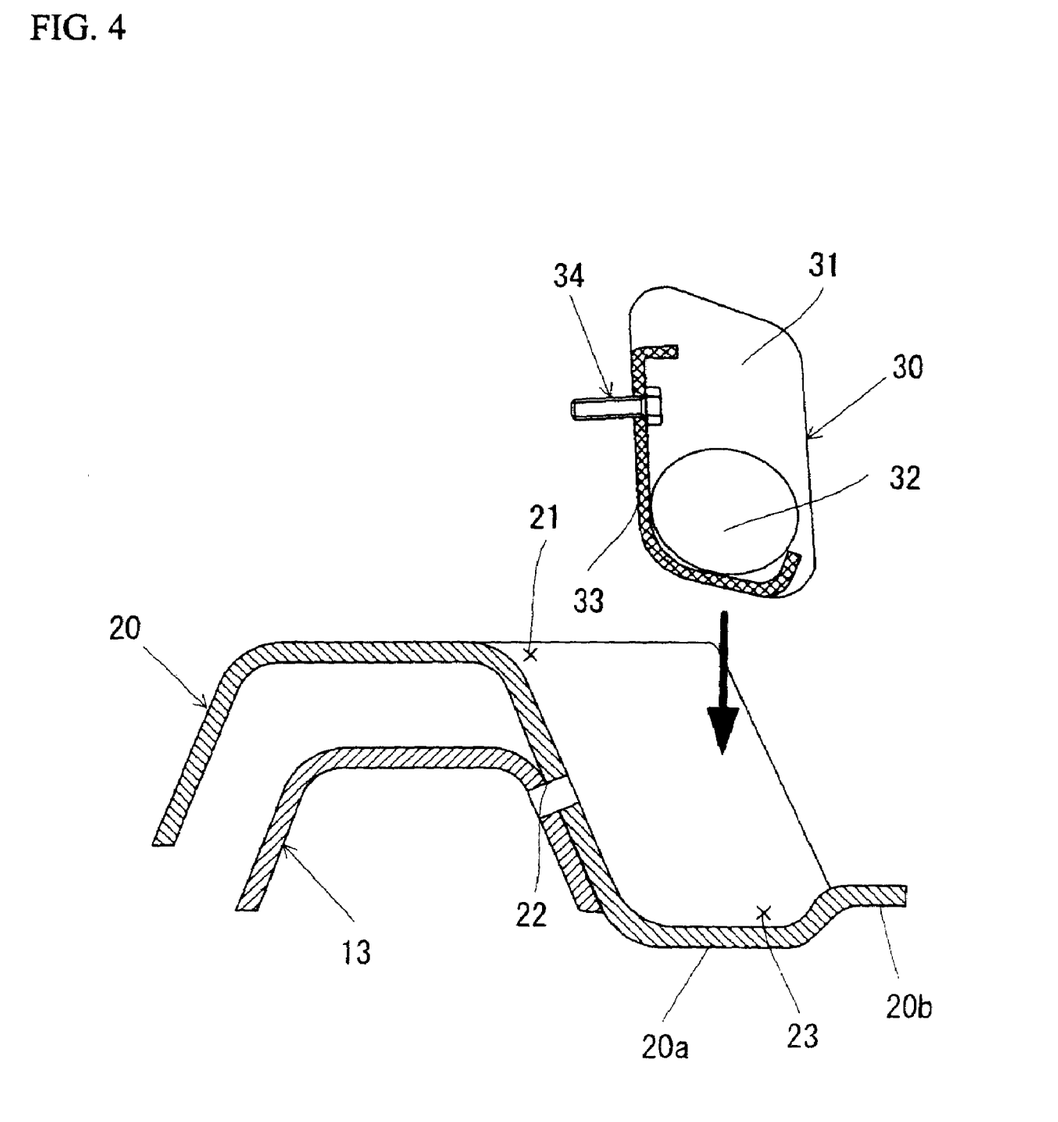
FIG. 4 is a cross-section showing a process for attaching and fixing the airbag module 30 into the housing portion 21 of the seat pan 20.
Figure 5:
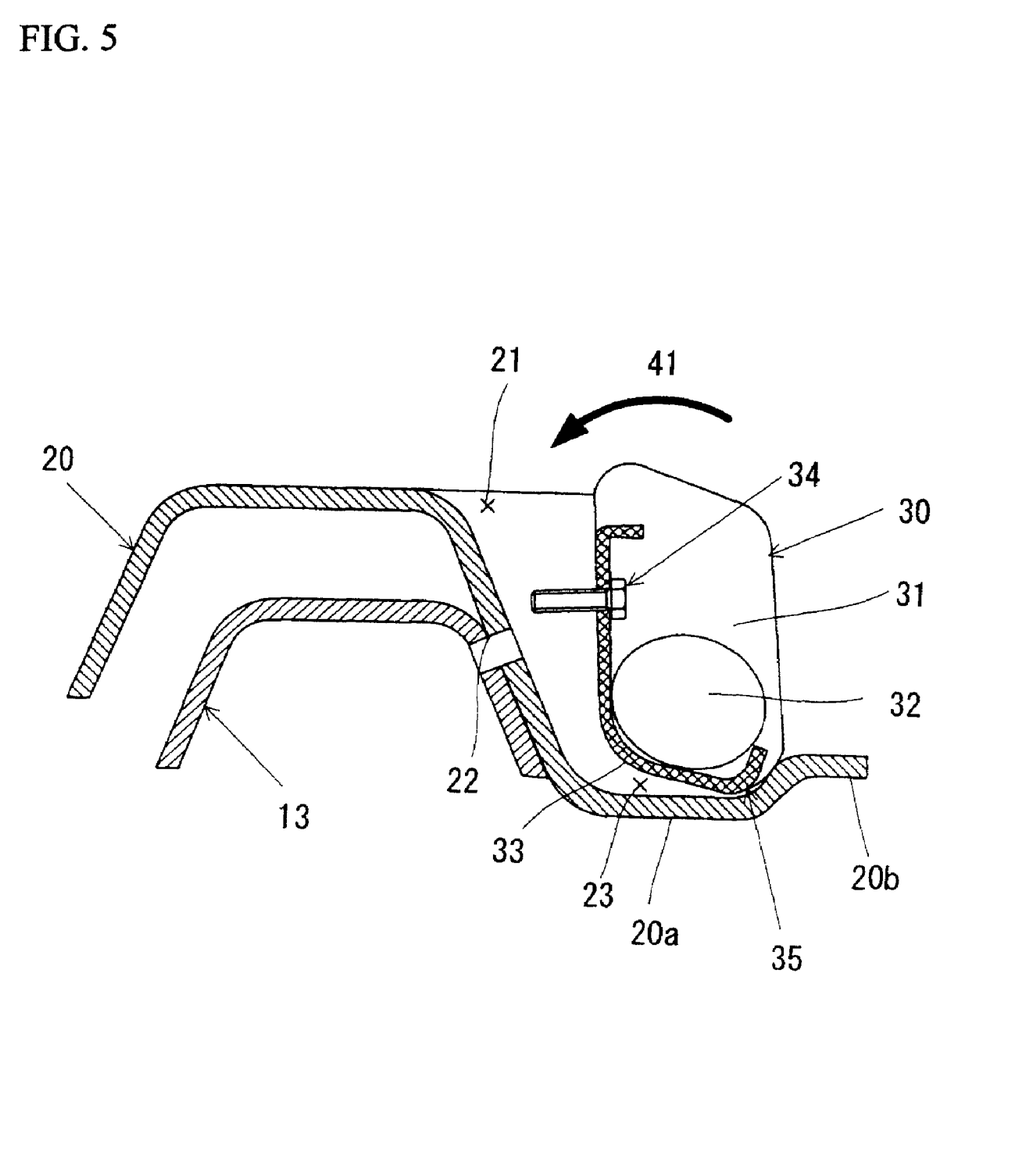
FIG. 5 is a cross-section showing a process for attaching and fixing the airbag module 30 into the housing portion 21 of the seat pan 20.
Figure 6:
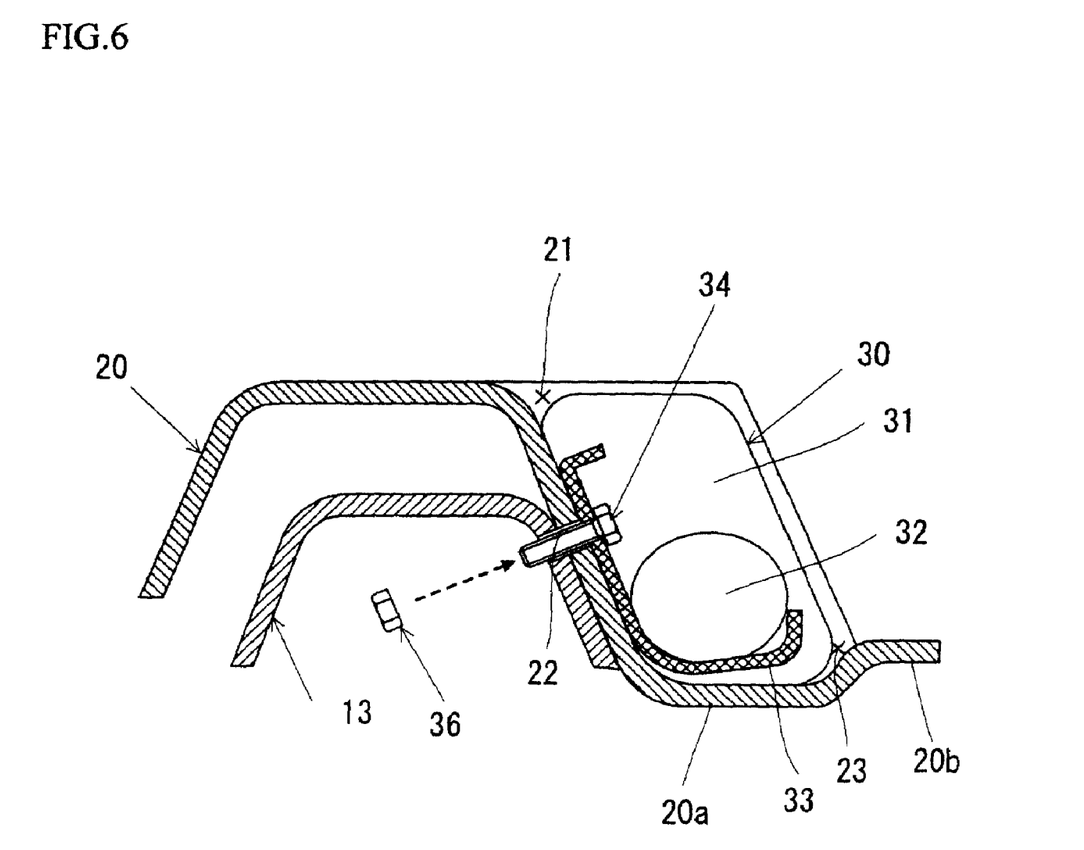
FIG. 6 is a cross-section showing the process for attaching and fixing the airbag module 30 into the housing portion 21 of the seat pan 20.

Continuously, with regard to the work until the airbag module 30 is attached and fixed to the seat pan 20 side, the same can be performed by at least using, for example, three steps shown in FIG. 4 through FIG. 6. At this moment, any of FIG. 4 through FIG. 6 is a cross-section showing a process for attaching and fixing the airbag module 30 to the housing portion 21 of the seat pan 20.

As shown in FIG. 4, in the first step, the airbag module 30 is inserted toward the hollow portion 23 (the first extension portion 20a) from above the seat pan 20, in a condition of being headed so as for a gas generator 32 side to be situated at a downside. At this time, the airbag module 30 can be easily introduced into the hollow portion 23 along a concaved shape of the hollow portion 23. Thus, a provisionally held condition of the airbag module 30 shown in FIG. 5 is formed. At this moment, the bolt axis of the fixing bolt 34 is extended approximately in a left-and-right direction.

Next, as shown in FIG. 5, in the second step, the airbag module 30 is rotated in a direction indicated by an arrow 41 in FIG. 5 around the step portion as a pivot fulcrum, in a condition in which a module lower portion 35 of the airbag module 30 in a provisionally held condition is in contact with the step portion between the first extension portion 20a and the second extension portion 20b. Further, the fixing bolt 34 is caused to be in close contact with the through-hole 22 by the rotation. Thereby, an inserting condition where the fixing bolt 34 is inserted into the through-hole 22 is formed, as shown in FIG. 6. In consideration of ease of insertion for the fixing bolt 34, it is preferable to use an elongate hole extending in an upper and lower direction, as the through-hole 22.

At the last, as shown in FIG. 6, in the third step, by fastening the fixing bolt 34 and the nut 36 with each other, an integrally formed condition (the condition shown in FIG. 2) where the retainer 33, the seat pan 20, and the bracket 13 are fastened and fixed to each other, is formed. At this moment, the airbag module 30, the seat pan 20 and the bracket 13 are fastened together and fixed by the fixing bolt 34, whereby pressure caused at the time when the airbag 31 is developed and expanded when the accident occurs, namely a load generated when the airbag module 30 is operated is to be received by the seat pan 20 and the bracket 13 that are integrally formed by being fastened and fixed together.

At this moment, since strength of the seat pan 20 can be raised by means of that a board thickness of the bracket 13 that is fastened and fixed together to the seat pan 20 is added to a board thickness of the seat pan 20, it is enabled that the strength required for the vehicle seat 100 is secured, upon suppressing the board thickness of the seat pan 20 in this extent. That is, the strength of the vehicle seat 100 can be secured while aiming at weight saving for the vehicle seat 100 by means of a cooperative work among the retainer 33, the seat pan 20, and the bracket 13. Incidentally, in a case that a specification, in which the board thickness of the seat pan 20 is suppressed, is considered, with regard to a board thickness, d1, of the seat pan 20, and a board thickness, d2, of the bracket 13, it is preferable to set the same on the basis of a relationship expressed by an inequality, $d1 \leq d2$.

Further, occurrence of an abnormal noise due to contact or the like of the seat pan 20 and the bracket 13 can be prevented by fastening and fixing together, and seating comfortableness of the vehicle seat 100 can be improved by raising the strength of the seat pan 20.

Furthermore, since the seat pan 20 is constructed to be fixed to the bracket 13 by together fastening and fixing, and the seat pan 20 is not required to be fixed to the left side frame 12a and the right side frame 12b by welding or the like, a manufacturing process of the vehicle seat 100 can be simplified.

By performing the aforementioned first to the third steps in the order, the work for attaching and fixing the airbag module 30 to the seat pan 20 side is facilitated. Specifically, in the second and third steps, the module lower portion 35 of the airbag module 30 held by the hollow portion 23 is caused to come into contact with the step portion between the first extension portion 20a and the second extension portion 20b from beginning to end during the time until the airbag module 30 is fastened to the seat pan 20 side by means of the fixing bolt 34. Since the airbag module 30 is thereby positioned, it is enabled to aim at improving an assembling capability of the airbag module 30.

Incidentally, the present invention is not limited to the aforementioned embodiment, and various applications and modifications are considered. For example, the following each embodiment, to which the aforementioned embodiment is applied, can be performed.

In the seat pan 20 in the aforementioned embodiment, although the case that the housing portion 21 that houses the airbag module 30 is opened diagonally upward toward the backside is described, the construction of the seat pan in the present invention can appropriately be changed as needed. For example, each embodiment shown in FIG. 7 through FIG. 9 can also be adopted.

Figure 7:
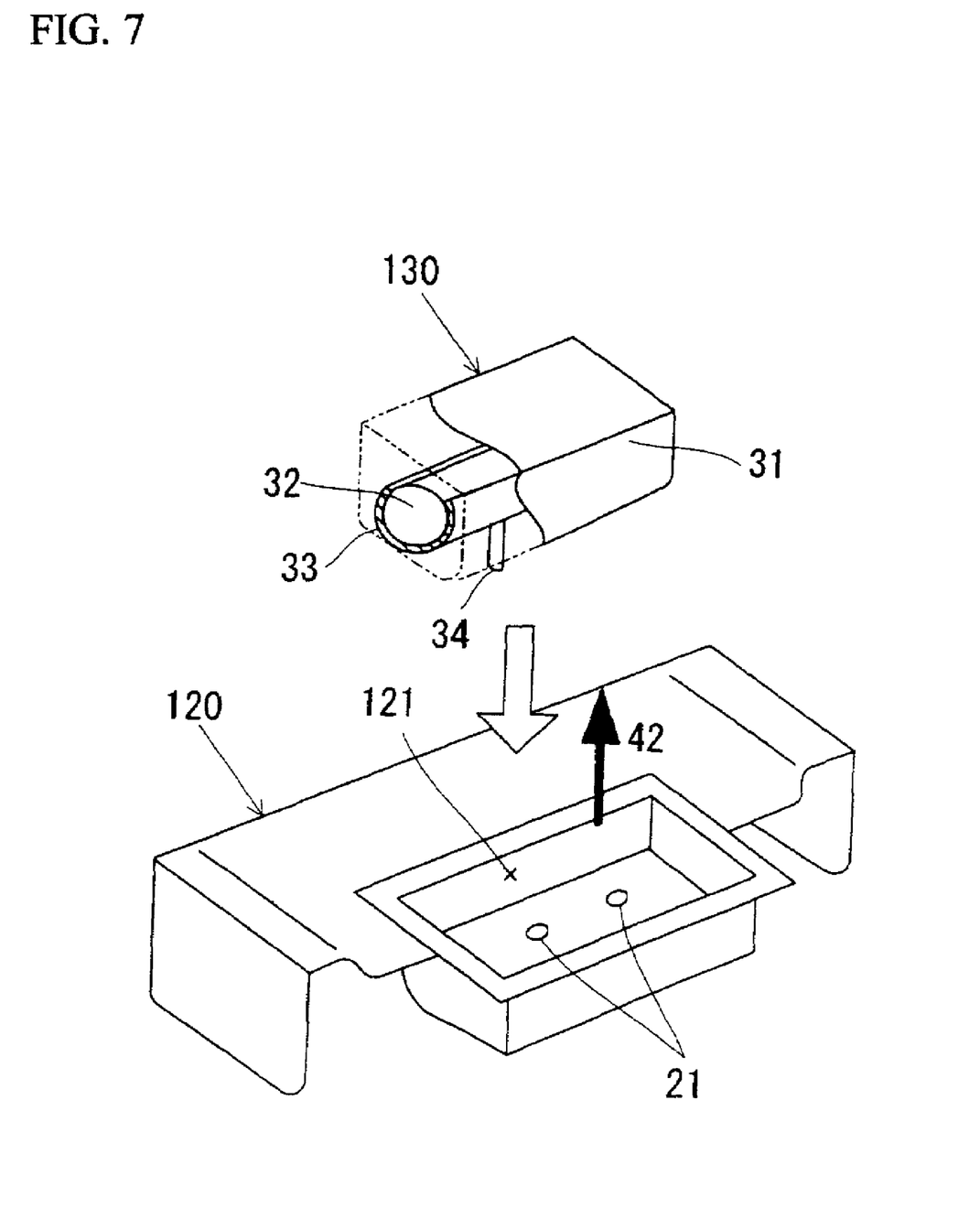
FIG. 7 is a perspective view showing a construction of a seat pan 120 and an airbag module 130 in another embodiment.

FIG. 7 is a perspective view showing a construction of a seat pan 120 and an airbag module 130 in another embodiment.

In the seat pan 120 in the embodiment shown in FIG. 7, a housing portion 121 that houses the airbag module 130 is constructed to open upward. In the airbag module 130 housed in the housing portion 121, the fixing bolt 34 is attached to a lower portion of the retainer 33. Accordingly, the airbag module 130 is inserted from above the housing portion 121 in a condition in which the fixing bolt 34 is facing downward, and the fixing bolt 34 is inserted into the through-hole 22 and fastened. Thereby, the airbag module 130 is attached to a seat pan 120 side and fixed thereto. In the airbag module 130, a developing direction of the airbag 31 that is developed and expanded when the accident occurs is an upside of the motor vehicle as shown by an arrow 42 in FIG. 7, and this direction is approximately conformed to an extending direction of the bolt axis of the fixing bolt 34.

Figure 8:
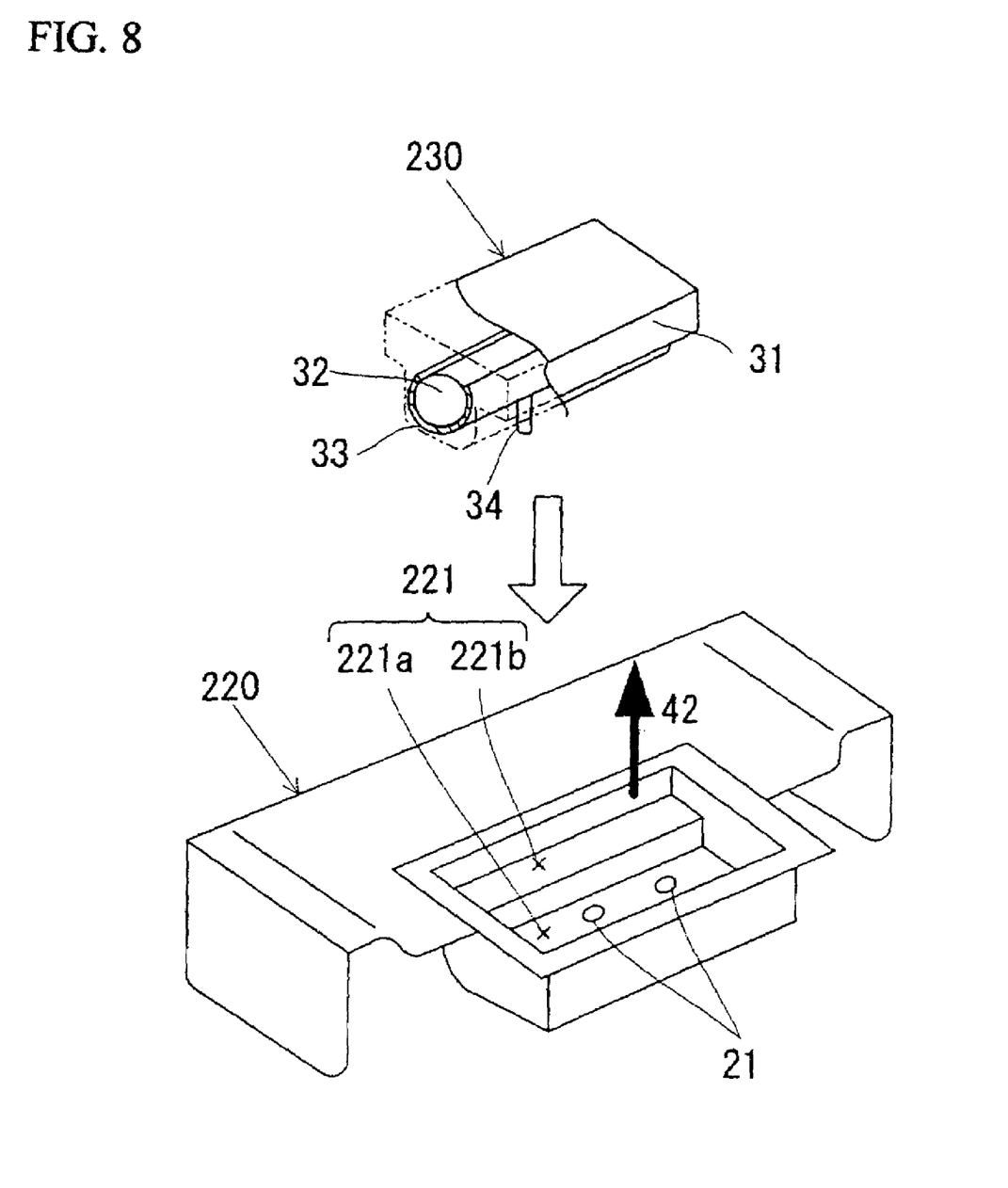
FIG. 8 is a perspective view showing a construction of a seat pan 220 and an airbag module 230 in still another embodiment.

Further, FIG. 8 is a perspective view showing a construction of a seat pan 220 and an airbag module 230 in still another embodiment.

In the seat pan 220 in the embodiment shown in FIG. 8, a housing portion 221 that houses the airbag module 230 is constructed to open upward. The housing portion 221 is configured to have a stepped structure where a difference of elevation is applied to, in relation to an upper and lower direction, and a position that is relatively deep in depth is configured to be a first housing area 221a for housing the retainer 33, and a position relatively shallow in depth is configured to be a second housing area 221b for housing the portion of the airbag 31 situated above the retainer 33 in relation to the retainer 33. In the airbag module 230 housed in the housing portion 221, the fixing bolt 34 is attached to the lower portion of the retainer 33. Accordingly, the airbag module 230 is inserted from above the housing portion 221 in the condition in which the fixing bolt 34 is facing downward, and the fixing bolt 34 is inserted into the through-hole 22 and fastened. Thereby, the airbag module 230 is attached to a seat pan 220 side and fixed thereto. In the airbag module 230, a developing direction of the airbag 31 that is developed and expanded when the accident occurs is an upside of the motor vehicle as shown by an arrow 42 in FIG. 8, and this direction is approximately conformed to an extending direction of the bolt axis of the fixing bolt 34.

Figure 9:
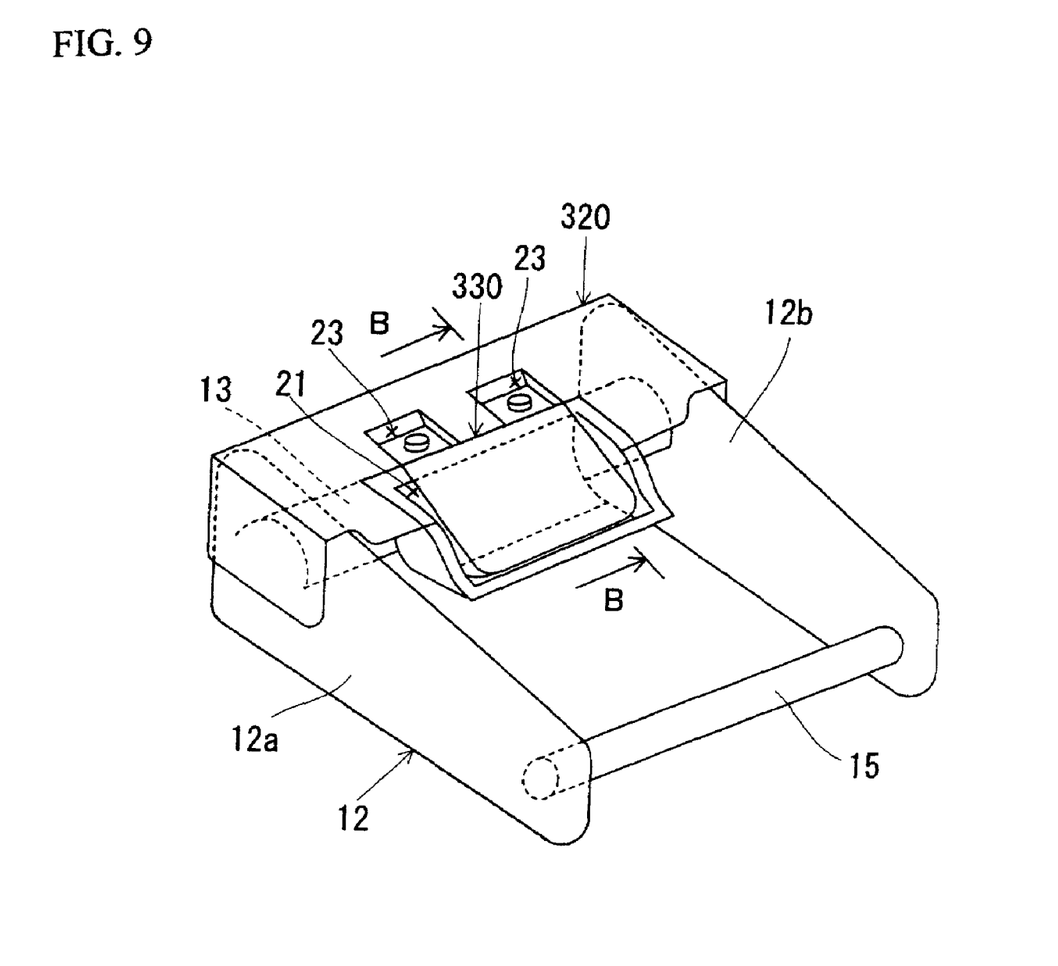
FIG. 9 is a perspective view showing a construction of a seat pan 320 and an airbag module 330 in a further embodiment.
Figure 10:
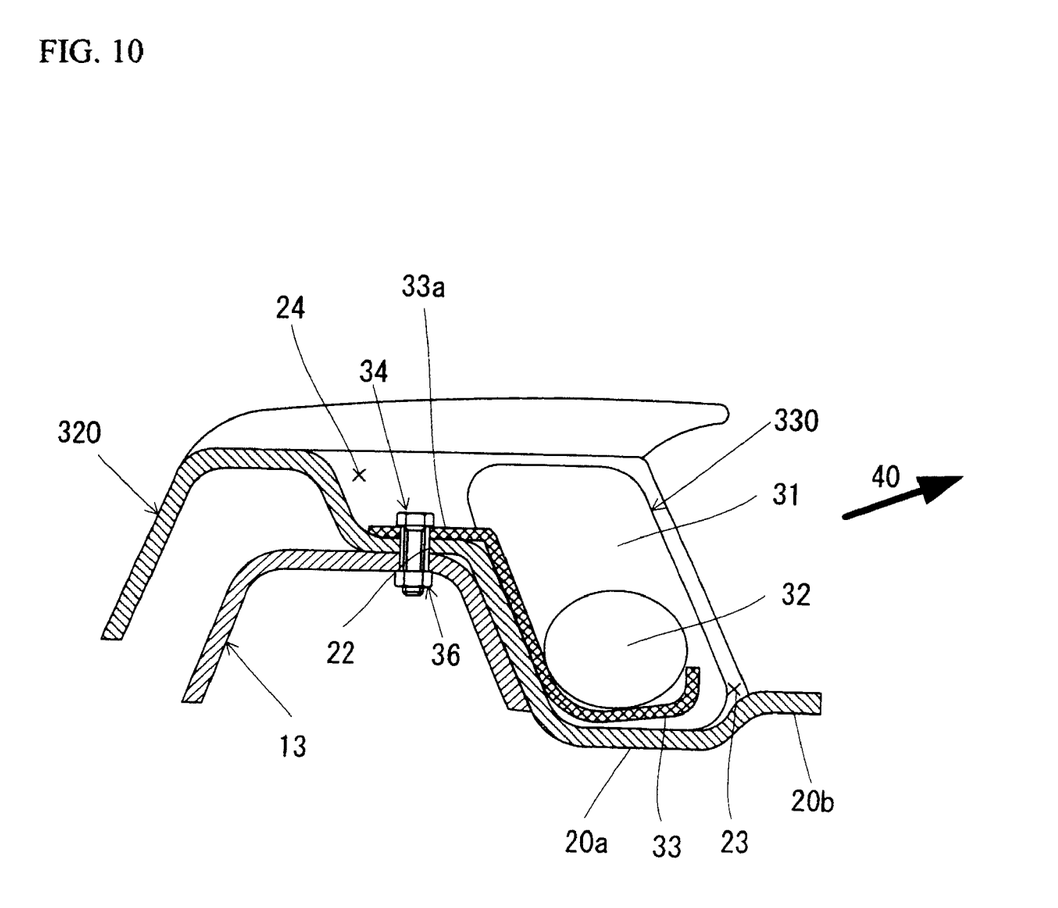
FIG. 10 is a cross-section along a line B-B in FIG. 9.

Furthermore, FIG. 9 is a perspective view showing a construction of a seat pan 320 and an airbag module 330 in a further embodiment, and FIG. 10 is a cross-section along a line B-B in FIG. 9.

Figure 11:
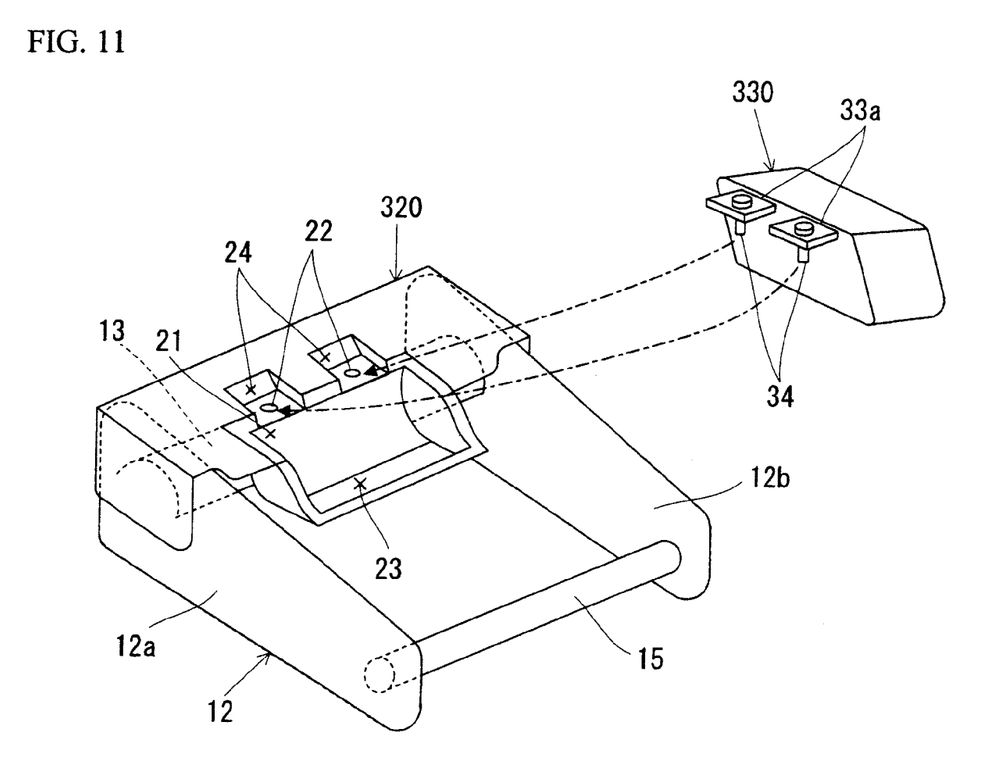
FIG. 11 is a perspective view schematically showing a work for housing the airbag module 330 into the housing portion 21 of the seat pan 320.

The seat pan 320 in the embodiment shown in FIG. 9 is provided with the housing portion 21 similar to that in the seat pan 20, and the seat pan 320 is constructed to be further provided with a left-and-right pair of housing portions, 24 and 24. On the other hand, as shown in FIGS. 10 and 11, in the airbag module 330 that is housed in the housing portion 21, a left-and-right pair of brackets 33a for bolts 34, is provided in the retainer 33. Each bracket for bolt 33a is fastened together and fixed to the seat pan 320 and the bracket 13 by means of the fixing bolt 34 and the nut 36 in a condition of being housed in each housing portion 24. In the airbag module 330, a developing direction of the airbag 31 that is developed and expanded when the accident occurs is configured to be a diagonally upward toward the backside direction as shown by an arrow 40 in FIG. 10, similar to that of a case of the airbag module 30.

At this moment, FIG. 11 is a perspective view schematically showing a work for housing the airbag module 330 into the housing portion 21 of the seat pan 320. As shown in FIG. 11, in the housing work for housing the airbag module 330, firstly, the airbag module 330 is moved to the housing portion 21 in a manner so as for the fixing bolt 34 at the airbag module 330 side to be headed toward the housing portion 24 of the seat pan 320. Then, after inserting the fixing bolt 34 into the through-hole 22 that penetrates the seat pan 320 and the bracket 13, the fixing bolt 34 and the nut 36 are fastened to each other. Thereby, a condition, in which the retainer 33, the seat pan 320, and the bracket 13 are fastened together and fixed, is formed.

Further, in the aforementioned embodiment, although the bracket 13 constructed to be a plate shape having a predetermined board thickness (curved plate shape in FIG. 1) is described, a structure of a member corresponding to the bracket 13 is not limited thereto, and is able to be changed into various types of the bracket as needed. In concrete terms, a construction member in which a through-hole for together-fastening is formed in a member, in which a cylindrically formed pipe-shaped member is pressed into a flat plate shape, a construction member in which a through-hole for together-fastening is formed in a plate-shaped member hung across a plurality of pipe-shaped member, a construction member in which a through-hole for together-fastening is formed in a member that is squeezed into a box-shape, or formed into a box-shape by bending processing, and so forth can also be used as a substitute member for the bracket 13.

Further, in the aforementioned embodiment, a case that the developing direction of the airbag at a time when the airbag is developed and expanded is approximately conformed to the extending direction of the fixing bolt is described. In the present invention, however, the construction may be formed such that the developing direction of the airbag and the extending direction of the fixing bolt intersect.

Moreover, in the aforementioned embodiment, although a construction of the vehicle seat 100 that is constructed as a driver's seat in which a driver is seated, or a passenger seat is explained, the characteristic part of the present invention can also be applied to a construction of various types of vehicle seats including the driver's seat or a passenger seat, for example, a rear seat. In the motor vehicle in this case, various types of motor vehicles moving with vehicle occupants taken on, such as automobiles, airplanes, boats and ships, electric trains, buses, trucks, and so forth are included.

What is claimed is:

1. An airbag device for a vehicle seat, the airbag device comprising:
    an airbag for being deployed to lift a seat cushion of the vehicle seat;
    a retainer for the airbag;
    a seat pan for supporting the seat cushion;
    opposite sides of the seat pan;
    a support member secured to one of the opposite sides of the seat pan with the retainer secured to the other of the opposite sides of the seat pan so that during airbag deployment the support member reinforces the seat pan;
    a fastener for securing the retainer, seat pan, and support member together with the fastener extending in an axial direction and the airbag being deployed in the axial direction,
    wherein the seat pan includes a recessed well in which the airbag and retainer are received with the well including a flat bottom wall portion, and the axial direction extends generally obliquely to the flat bottom wall portion.

2. The airbag device of claim 1 wherein the recessed well includes an inclined forward wall to which the retainer and support member are secured with the fastener so that the fastener extends generally orthogonally to the inclined wall.

3. The airbag device of claim 1 wherein the retainer carries a fastener, and the seat pan and support member have aligned apertures for fitting the fastener therethrough with the fastener securing the retainer, seat pan, and support member together.

4. The airbag device of claim 3 including an airbag module comprising the airbag and an inflator secured to the retainer, and mounting indicia at a predetermined location of the seat pan so that with a predetermined portion of the airbag module placed thereon, the airbag module is in position to be pivoted to fit the fastener through the aligned apertures.

5. The airbag device of claim 4 wherein the mounting indicia comprises a step portion of the seat pan.

6. The airbag device of claim 4 wherein the aligned apertures are elongated to permit the fastener, after pivoting, to fit therein.

7. The vehicle seat comprising:
    a base frame including a pair of side frame members;
    a seat pan spanning the side frame members for supporting a cushion thereon;
    an airbag module secured to the seat pan;
    an airbag for being deployed to push the seat cushion generally upwardly;
    a support member spanning the side frame members and connected thereto to
    allow the seat pan to be fixed to the support member without requiring that the seat pan also be separately fixed to the side frame members; and
    at least one fastener for securing the seat pan, airbag module and support member together.

8. The vehicle seat of claim 7 wherein the seat pan has opposite sides, the support member is secured to one the opposite sides of the seat pan and the airbag module is secured to the other the opposite sides of the seat pan to provide the seat pan with reinforcement for airbag deployment.

9. A vehicle seat comprising:
    a base frame including a pair of side frame members;
    a seat pan spanning the side frame members for supporting a cushion thereon;
    an airbag module secured to the seat pan;
    an airbag for being deployed to push the seat cushion generally upwardly; and
    a support member spanning the side frame members and connected thereto to allow the seat pan to be fixed to the support member without requiring that the seat pan also be separately fixed to the side frame members,
    wherein the seat pan has opposite sides, the support member is secured to one of the opposite sides of the seat pan, the airbag module is secured to the other of the opposite sides of the seat pan to provide the seat pan with reinforcement for airbag deployment, and the support member has a thickness that is equal to or greater than that of the seat pan.

10. A vehicle seat comprising:
    a base frame including a pair of side frame members;
    a seat pan spanning the side frame members for supporting a cushion thereon;
    an airbag module secured to the seat pan;
    an airbag for being deployed to push the seat cushion generally upwardly; and
    a support member spanning the side frame members and connected thereto to
    allow the seat pan to be fixed to the support member without requiring that the seat pan also be separately fixed to the side frame members,
    wherein the seat pan has a recessed well in which the airbag module fits for being mounted therein.

11. The vehicle seat of claim 10 wherein the recessed well includes an inclined wall against which the airbag module is secured, and the airbag is deployed in a predetermined deployment direction that is generally orthogonal to the inclined wall.

12. The vehicle seat of claim 11 wherein the support member extends along the side of the inclined wall opposite to the side against which the airbag module is secured.

13. The vehicle seat of claim 11 including a fastener extending in the deployment direction that secures the airbag module, seat pan and support member together.

14. The vehicle seat of claim 11 wherein the seat pan includes at least one upper recess adjacent the well, and opposite sides of the upper recess, the airbag module includes a retainer having a tab projection that fits in the upper recess, the support member extends along one of the opposite sides of the seat pan upper recess and the tab projection is engaged against the other of the opposite sides of the seat pan upper recess, aligned apertures of the tab projection, upper recess, and support member, and a fastener fit through the aligned apertures to secure the retainer, seat pan and support member together.

* * * * *

UNITED STATES PATENT AND TRADEMARK OFFICE
CERTIFICATE OF CORRECTION

PATENT NO.        : 7,559,605 B2
APPLICATION NO.   : 11/678152
DATED             : July 14, 2009
INVENTOR(S)       : Hiromichi Yoshikawa et al.

It is certified that error appears in the above-identified patent and that said Letters Patent is hereby corrected as shown below:

Claim 3, Column 11, Line 43, delete "a fastener" and insert -- the fastener --.

Claim 7, Column 11, Line 58, delete "The" and insert -- A --.

Claim 8, Column 12, Line 7, delete "one the" and insert -- one of the --.

Claim 8, Column 12, Line 9, delete "other the" and insert -- other of the --.

Signed and Sealed this

Thirteenth Day of October, 2009

David J. Kappos
*Director of the United States Patent and Trademark Office*